US009861081B2

(12) United States Patent
Borchersen et al.

(10) Patent No.: US 9,861,081 B2
(45) Date of Patent: Jan. 9, 2018

(54) SYSTEM FOR DETERMINING FEED CONSUMPTION OF AT LEAST ONE ANIMAL

(71) Applicant: VIKING GENETICS FMBA, Randers SO (DK)

(72) Inventors: Soren Borchersen, Horsens (DK); Niels Worsoe Hansen, Lejre (DK); Claus Borggaard, Viby Sj (DK)

(73) Assignee: Viking Genetics FMBA, Randers (DK)

( * ) Notice: Subject to any disclaimer, the term of this patent is extended or adjusted under 35 U.S.C. 154(b) by 60 days.

(21) Appl. No.: 14/783,273

(22) PCT Filed: Apr. 10, 2014

(86) PCT No.: PCT/DK2014/050087
§ 371 (c)(1),
(2) Date: Oct. 8, 2015

(87) PCT Pub. No.: WO2014/166498
PCT Pub. Date: Oct. 16, 2014

(65) Prior Publication Data
US 2016/0066546 A1   Mar. 10, 2016

(30) Foreign Application Priority Data
Apr. 10, 2013   (DK) .................................. 2013 70195

(51) Int. Cl.
*G06K 9/00* (2006.01)
*A01K 29/00* (2006.01)
(Continued)

(52) U.S. Cl.
CPC .............. *A01K 29/005* (2013.01); *A01K 5/02* (2013.01); *A01K 11/004* (2013.01); *A01K 11/006* (2013.01); *A01K 29/00* (2013.01)

(58) Field of Classification Search
USPC ....... 382/100, 103, 106–107, 154, 155, 162, 382/168, 173, 181, 209, 219, 232, 254,
(Continued)

(56) References Cited

U.S. PATENT DOCUMENTS

2005/0257748 A1* 11/2005 Kriesel ................ A01K 11/008
119/51.02
2007/0288249 A1* 12/2007 Rowe ................... A01K 1/0023
705/7.11
(Continued)

FOREIGN PATENT DOCUMENTS

DE            3833902        11/1989
EP            296256         12/1988
(Continued)

*Primary Examiner* — Seyed Azarian
(74) *Attorney, Agent, or Firm* — Baker & Hostetler LLP

(57) ABSTRACT

The invention regards an animal monitoring system for determining feed consumption of one or more animals feeding at a feeding area, comprising an imaging unit for range imaging the feeding area, identification means configured to uniquely identify each feeding animal, and processing means configured for assessing the amount of feed consumed by each identified animal by determining the reduction of feed in subsequent images of the feeding area in front of each identified animal.

23 Claims, 2 Drawing Sheets

(51) Int. Cl.
*A01K 5/02* (2006.01)
*A01K 11/00* (2006.01)
*A01K 61/02* (2006.01)

(58) Field of Classification Search
USPC ....... 382/274, 276, 286–291, 305, 312, 110; 705/7.11; 119/51.01, 57.5; 1/1
See application file for complete search history.

(56) References Cited

U.S. PATENT DOCUMENTS

| | | | |
|---|---|---|---|
| 2009/0216775 A1* | 8/2009 | Ratliff ................... | G06Q 10/08 |
| 2010/0199915 A1* | 8/2010 | Pettersson ............. | A01J 5/0175 |
| | | | 119/14.08 |
| 2011/0126770 A1* | 6/2011 | Mulder ................. | A01K 19/00 |
| | | | 119/51.01 |
| 2011/0297091 A1* | 12/2011 | Chamberlain ....... | A01K 5/0291 |
| | | | 119/51.02 |

FOREIGN PATENT DOCUMENTS

| WO | WO 91/10358 | 7/1991 |
|---|---|---|
| WO | WO 01/17340 | 3/2001 |
| WO | WO 2005/067704 | 7/2005 |
| WO | WO 2008/097080 | 8/2008 |
| WO | WO 2008/118004 | 10/2008 |
| WO | WO 2008/118005 | 10/2008 |
| WO | WO 2008/123820 | 10/2008 |
| WO | WO 2013/157934 | 10/2013 |

\* cited by examiner

A. (Animal no. 3512)

B. (Animal no. 3511)

C. (Animal no. 3772)

D. (Animal no. 2445)

SYSTEM FOR DETERMINING FEED CONSUMPTION OF AT LEAST ONE ANIMAL

FIELD OF INVENTION

The invention relates to a system and method for determining feed consumption of at least one animal in a livestock and/or for determining the individual feed consumption of a plurality of animals in a livestock.

BACKGROUND OF THE INVENTION

Feed for livestock, such as cattle, is mainly given as concentrates and roughage. The high energy feed concentrate comprises rapeseed meal, soybean meal and minerals and vitamins, whereas fibre rich roughage comprises grass silage, corn silage, alfalfa or straw from grass seed or grain crops. However, feed for animals, as used herein, may comprise concentrate, roughage, additives, by-products and in general anything that can be eaten and digested by the animals.

Some farmers prefer to separate concentrate and roughage and provide each separately in order to control and monitor the amount of concentrate provided to the animals, and systems for dosing feed concentrate are known in the art. However, it is becoming more common to mix the concentrate and the roughage (and other relevant and appropriate animal feed) and provide this mixture to the animals via the normal feeding area, e.g. in a cowshed. The feeding area is typically common to many animals, possibly feeding at the feeding area simultaneously.

SUMMARY OF THE INVENTION

The total feed consumption for an entire livestock is easily determined, because the farmer monitors the gross amount of feed purchased and distributed to the animals, but it is a challenge to monitor the feed consumption of the individual animal in the livestock. Prior art systems are based on weighing the amount of feed and supplying separately to specific animals, but that is not a feasible and cost effective solution. But when the feed is distributed on a common feeding area in a cowshed the farmer has no way of assessing the feed consumption of the individual animals. It is therefore a purpose of the present disclosure to provide a method and system for determining feed consumption of at least one animal in a livestock, and for determining and/or comparing the individual feed consumption of a plurality of animals in a livestock. In particular it is a purpose of the present disclosure to monitor, determine and/or compare the feed consumption for individual animals among a plurality of animals feeding at a common feeding area. One embodiment therefore relates to an animal monitoring system for determining feed consumption of one or more animals feeding at a feeding area, comprising an imaging unit for range imaging the feeding area, identification means configured to uniquely identify each feeding animal, and processing means configured for assessing the amount of feed consumed by each identified animal by determining the reduction of feed in subsequent images of the feeding area in front of each identified animal.

Another embodiment relates to a system for determining feed consumption of at least one animal in a livestock comprising, at least one identification tag attached to the at least one animal, whereby a specific animal can be identified, a feeding area having feed accessible to the at least one animal, at least one camera adapted to acquire images of the feed in the feeding area at different times, processing means adapted to determine the feed consumed by an identified specific animal by analysing the reduction of feed as represented on at least two images.

The presently disclosed animal monitoring system is preferably suitable for installation in a building housing livestock, such as a cowshed. Further, the feed may be any feed appropriate for animals such as cows, in particular roughage, concentrate, and/or a mixture thereof.

A further embodiment relates to a method for assessing the feed consumption of one or more animals feeding at a feeding area, comprising
 acquiring range images of the feeding area at different times,
 identifying at least one of said feed consuming animals in at least two of said range images, and
 assessing the amount of feed consumed by each identified animal by determining the reduction of feed between said at least two range images.

Yet a further embodiment relates to a method for assessing the relative feed consumption of a plurality of animals in a livestock feeding at a feeding area,
 acquiring range images of the feeding area at different times,
 identifying all animals consuming feed,
 assessing the amount of feed consumed by each identified animal by determining the reduction of feed between at least two range images displaying an identified animal, and
 determining the amount of feed consumed by one identified animal relative to the amount of feed consumed by the remaining identified animals.

Thus, with the above mentioned systems and methods it is possible to determine the amount of feed each animal has consumed, because the range imaging of the feed reduction can provide the volume of the feed consumed by each animal, whereby the farmer can get the full picture of the consumption, for example for the entire livestock and/or for each individual animal in the livestock. Correlating with the output from each animal, e.g. the milk production, the contribution margin for each animal can be determined. This enables the farmer to calculate the efficiency, cost-effectiveness and environmental impact of an individual animal and/or the entire livestock. Based on these calculations the farmer can for example identify the animals most suitable for breeding. In addition, variations in feed intake for an individual animal can be used to detect the health condition and when an animal is in heat.

DESCRIPTION OF THE DRAWINGS

The invention will in the following be described in greater detail with reference to the accompanying drawings.

DETAILED DESCRIPTION OF THE INVENTION

Figure 1:
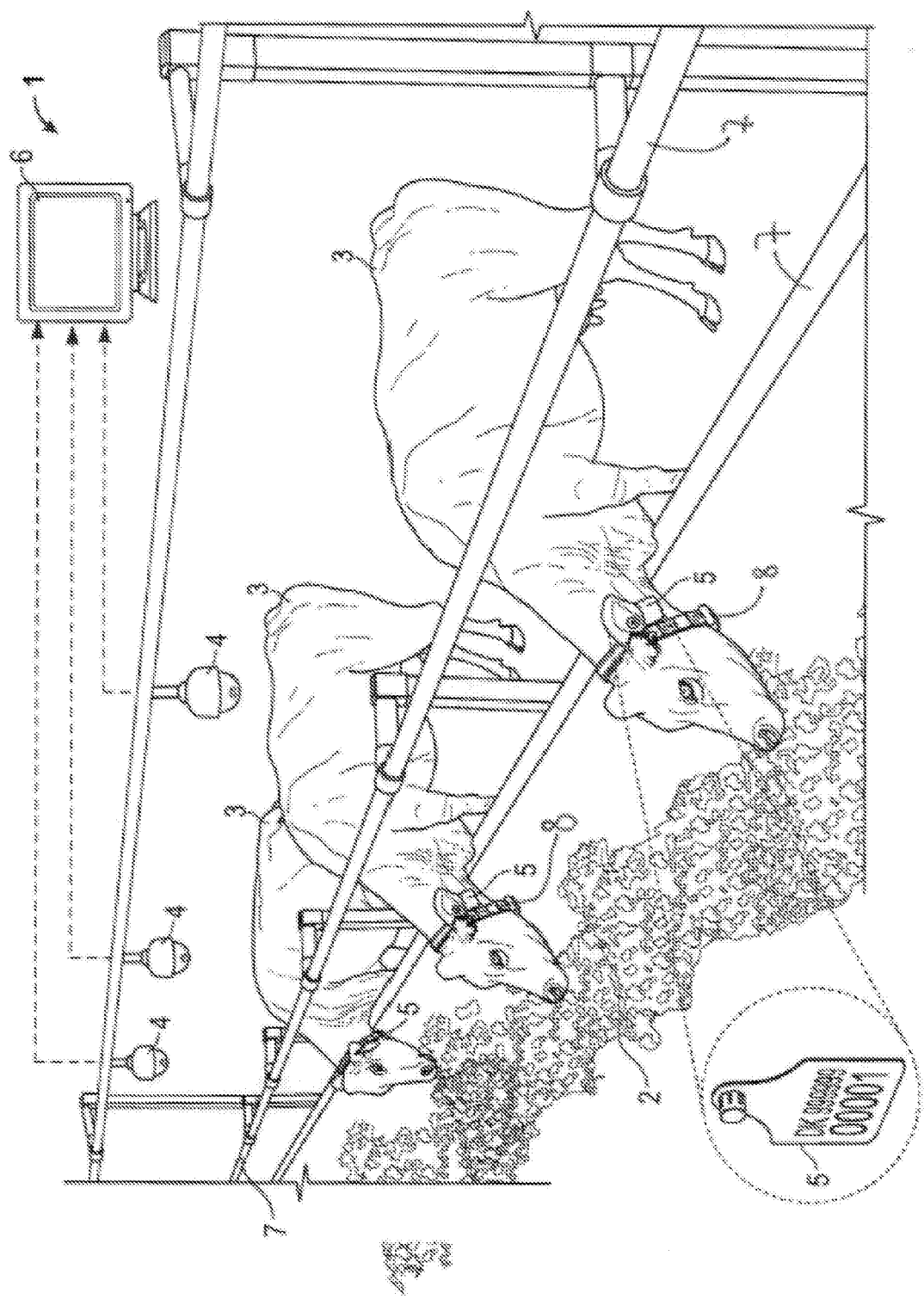
FIG. 1 a schematic view of an embodiment of the invention.
Figure 2:
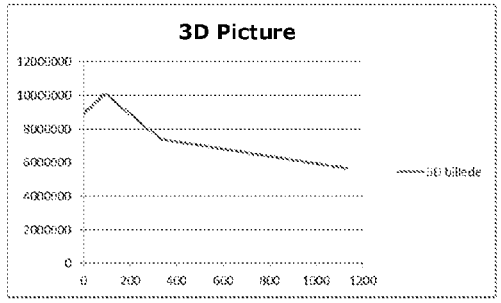
FIGS. 2a-d show correlations between actual and calculated feed consumption of four different cows.
Figure 2:
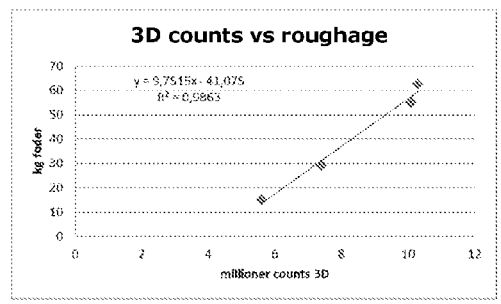
Figure 2:
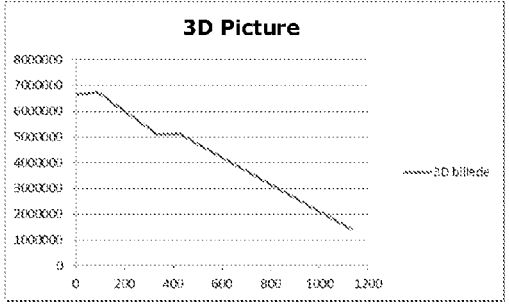
Figure 2:
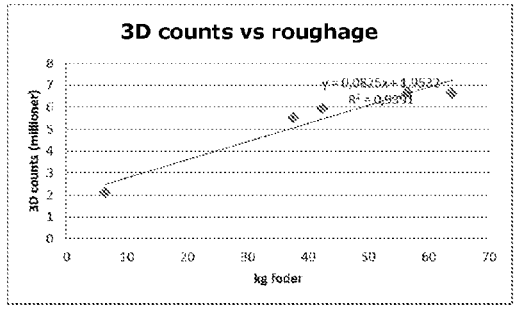
Figure 2:
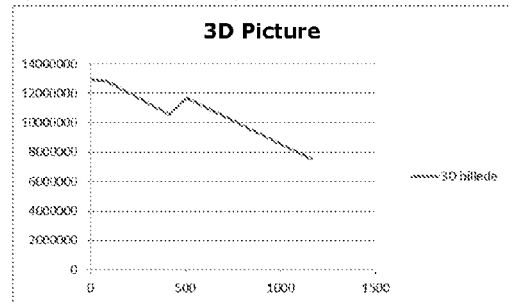
Figure 2:
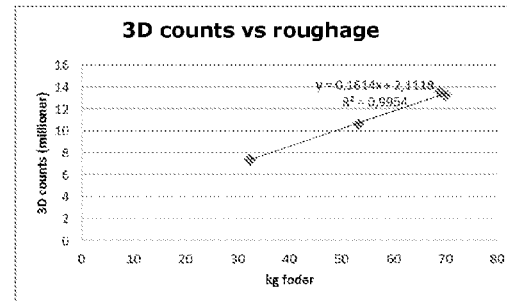
Figure 2:
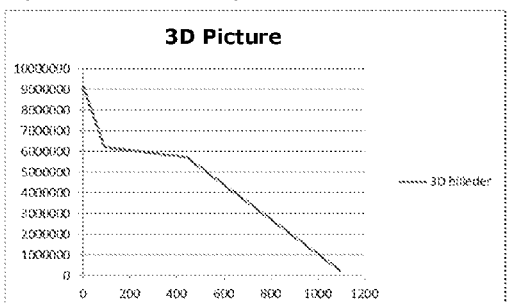
Figure 2:
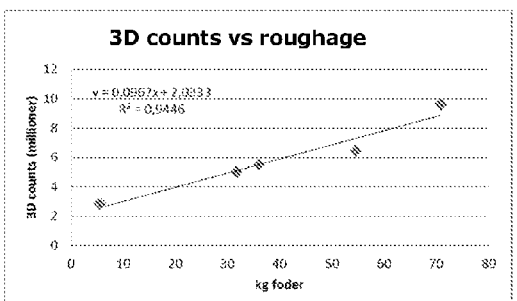

The imaging unit preferably comprises one or more cameras, preferably cameras adapted for range imaging, such as range cameras. Examples of range imaging techniques applicable herein are time-of-flight, stereo triangulation, structured light, light-field imaging, etc. Each range camera may be provided with a depth sensor and a 2D camera, such as a RGB camera, for example as known from the Kinect cameras. Other possible solutions are stereo cameras (e.g. pairs of 2D cameras), time-of-flight cameras, structured light cameras, or light-field cameras for 4D light-field imaging. The imaging unit may also be configured for acquiring topographic images. With range imaging it is possible to determine the distance from a camera to the feed and thereby determine the volume of feed with a higher accuracy.

The imaging unit may be configured for continuously imaging at least a part of the feeding area. E.g. the imaging unit may be adapted to acquire a series of images, which allows determining the feed consumption of the animal over a period of time. For example, the imaging unit could acquire images continuously, thereby allowing determination of the feed consumption in real time. In one embodiment, the imaging unit acquires at least one image per minute, or at least one image every 1 to 5 minutes. For example, the images are acquired as a video signal or at least once per minute, e.g. every 1, 5, 10, 20 or 30 second. The number of images acquired should be sufficient to validly monitor the feed consumption. The imaging unit may be configured for imaging at least a part of the feeding area at predefined and/or selected time points. I.e. instead of continuously acquire images with fixed intervals, the system may be configured such that certain actions, e.g. related to the animals, may trigger acquirement of an image or a series of images. Thus, the system may be configured to determine when an identified animal is initiating, pausing and/or ending a feeding process. Or the system may be configured to determine when an identified animal removes the head from the feeding area. Such actions may result in acquirement of one or more images. E.g. the system may be configured such that a range image is acquired when an identified animal removes the head from the feeding area or when an identified animal initiates and/or ends a feeding process. The system may also be configured such that images are acquired continuously with fixed intervals, but only certain images are stored and/or processed, e.g. images relating to predefined actions, e.g. relating to the animals feeding. An animal may be identified before, during or after acquirement of images, e.g. animals are identified during the processing of images.

Animal feed is not necessarily a homogenous mixture and the density of the feed may vary from time to time. It can therefore be difficult to determine the exact weight of the feed consumed by the animals, based on image analysis. One way of assessing the amount of feed consumed by the animals is to determine the reduction of the feed from beginning of the feeding process to the end and/or while the animals are eating, even when using range imaging. The reduction in feed between subsequent images may be determined calculating the difference in height of corresponding image areas, such as pixels. The "missing" element or volume between subsequent images is the feed consumed by an animal. The feed may be identified in each image or a virtual feeding area corresponding to a specific animal may be identified or selected in images, thereby representing feed in subsequent images, and only corresponding image areas are selected for determining the reduction in volume of the feed. Range images would be an advantage in such a situation.

The imaging unit may be configured such that several images are acquired simultaneously. The processing means may then be adapted to combine these images in order to determine the amount of feed in the feeding area. Hereby, the amount of feed in the feed area can be determined with a higher accuracy. The technique of combining images is also known as stitching images.

In an embodiment, the system further comprises means for controlling the position and/or the angle of the imaging unit and/or the position and/or the angle of cameras of the imaging unit. Hereby, the camera or cameras can be moved to the optimum position ensuring optimal images of the feed, which leads to a more accurate determination of the animal's feed consumption. Further, it makes it possible to use a small number of cameras to cover a large amount of feed by moving along the feed and capturing images at the same time.

Alternatively the imaging unit may be configured to be stationary. Even though it may require more cameras, it may be simple and inexpensive to install and thereby more cost effective in total. Further, it is possible to use a plurality of fixed cameras instead of a smaller amount of moving cameras hereby enhancing the precision of the measurements made based on the images.

The imaging unit may further be configured for imaging a predefined and/or selected part of the feeding area. This may the case with translatable and/or rotatable cameras of the imaging unit. However, it may also be the case if the imaging unit comprises several cameras, each camera view different parts of the feeding area. The system may then be configured to only acquire images of the part of the feeding area where activity, e.g. feeding activity, is registered. To reduce the cost of the system, the amount of cameras in the imaging unit is typically less than the number of animals that are monitored. Thus, each image may contain a plurality of animals. Furthermore, the feeding area may be common for several animals. However, as each animal typically can be identified, the feeding area for each cow can typically be assessed with image processing, and if images are acquired continuously while the animals are eating, the feed consumption of each animal can still be assessed by determining the reduction in feed between subsequent images.

For example the processing means may be configured to divide images of the feeding area into one, two, three, four or more animal specific parts, each animal specific part may be corresponding to an identified animal. I.e. images from the imaging unit containing (at least a part of) the feeding area may be divided according to the specific identified animals. The division may be predefined and fixed for each image. But the division may also be customized and/or continuously updated, e.g. according to the identification and/or position of identified animals in at least a part of the images. E.g. the processing means may be configured to select an animal specific part of an image of the feeding area based on the position of the front or the head of said animal. E.g. an animal specific part may be an area in front of said animal, such as a predefined area, such as a predefined area relative to the position of the animal, such as the head of the animal. E.g. a predefined area selected in an image relative to the position of the head of an identified animal, e.g. when the animal removes the head from the feeding area. The selected feeding area is then depending on the position of the animal's head and only feed in this selected feeding area of the image is processed to determine the reduction in feed between subsequent images, the reduction then corresponds to the amount of feed eaten by the specific animal in a specific period. Thereby information of what this specific identified animal has eaten during a certain eating period can be determined, and the total amount of feed eaten by each animal can found by adding the amount eaten in each of these periods. The system can thereby account for the situation where a plurality of animals stand next to each other eating of a shared feeding area, where some animals eat of the neighbour's feeding area.

Identification

The identification means of the system is preferably configured to uniquely identify each feeding animal. This is to provide the necessary information such that the amount of feed consumed can be related to specific animals. In one embodiment the identification means are configured to identify a feeding animal by means of an identification tag attached to each animal. The identification tags may be visible tags comprising letters, numbers and/or symbols. E.g. in the form of colour codes or black and white pattern codes. This is a relatively cheap arrangement and animals in a livestock are normally marked, for example cows are conventionally marked with a tag attached to their ear. The identification means may be configured to identify a feeding animal by identifying a colour code, symbol code, pattern code and/or a barcode of an identification tag attached to the animal, e.g. as a collar or to an ear. Hence, these visible tags may be viewable in images acquired by the imaging unit. Identification tags for animals are well known in the art. Identification of animals may further be provided by means of GPS, e.g. each animal may be provided with a tracking unit, e.g. the identification tags may form or comprise tracking units.

Identification of the animals may be part of the processing means, e.g. images showing the feeding area also show at least a part of the feeding animals, and the animals can then be identified in the images by means of image processing. Hence, the processing means may be adapted to identify a specific animal via a visible tag on the images. The processing means may be adapted to detect a specific colour code, barcode or (2D) pattern on an ear tag or a collar of the animal. In one embodiment, the animal carries a collar with a specific colour code, symbol code, and/or bar code, which can be used to identify the individual animal by said processing means.

The imaging unit may comprise one or more specific cameras for providing the actual identification of the animals, such as 2D cameras, such as RGB cameras. E.g in one embodiment the system comprises one or more cameras specifically adapted to detect a colour code. Such cameras are usually capable of acquiring colour images. However, the system may further comprise one or more cameras specifically adapted to detect a symbol code, pattern and/or a barcode, for example in the form of black and white symbols. Some barcodes can for example be identified by means of simple line scanners.

In an embodiment, the system further comprises a tag reader suitable for wirelessly identifying a specific animal in the feeding area. E.g. the identification means comprises one or more RF identification tag readers suitable for wirelessly identifying animal(s) wearing an RF identification tag. This can, for example, be done by use of a RFID (Radio-frequency identification) chip implanted in the animal. Hereby, the identification of the animal is not dependent on the images acquired by a camera in the imaging unit and that a tag needs to be visible in order to identify the animal.

Identification may further be provided by means of GPS, e.g. using GPS tracking units for each animal.

In one embodiment the identification means comprises identification tags for attachment to said animal(s). I.e. identification tags may be part of the system, and may be specifically developed for the purpose of being identifiable in the images acquired by the imaging unit. The tags may be visible and/or RF tags as mentioned above.

Method

As stated previously the present disclosure further relates to a method for assessing the feed consumption of one or more animals feeding at a feeding area, comprising
- acquiring range images of the feeding area at different times,
- identifying at least one of said feed consuming animals in at least two of said range images, and
- assessing the amount of feed consumed by each identified animal by determining the reduction of feed between said at least two range images.

A method for assessing the relative feed consumption of a plurality of animals in a livestock feeding at a feeding area,
- acquiring range images of the feeding area at different times,
- identifying all animals consuming feed,
- assessing the amount of feed consumed by each identified animal by determining the reduction of feed between at least two range images displaying an identified animal, and
- determining the amount of feed consumed by one identified animal relative to the amount of feed consumed by the remaining identified animals.

The present disclosure further regards a method for determining feed consumption of at least one animal in a livestock comprising the steps of, providing a feeding area having feed accessible to the at least one animal, supplying the at least one animal with an identification tag to identify a specific animal, acquire a plurality of images of the feeding area at different times, identify a specific feed consuming animal on the plurality of images, by use of the images of the specific feed consuming animal determine the reduction of feed as disclosed on those images, wherein the feed consumption for the specific animal is determined as the reduction of feed on those images.

The reduction in feed between subsequent images may be determined by identifying the feed in each image and calculating the difference in height of corresponding image areas, such as pixels, representing feed in subsequent images. The base level of the feeding area may be known, e.g. by having range images of the empty feeding area as a reference. As previously mentioned it may be difficult to determine the exact amount of feed consumed by each animal, but the relative feed consumption of a plurality of animals in a livestock can be compared by means of the presently disclosed system and method. The farmer also typically knows the how much milk each cow produces and by knowing (at least the relative) amount of feed consumed by the cows, the yield of the cow can be optimized. Thus, it is not necessarily the highest producing cow that most efficiently converts feed in the form of concentrate and roughage into milk. With the presently disclosed system and method the farmer can get the full picture of the conversion yield of each cow in the livestock.

Advantageously, the images are acquired by use of at least one camera, preferably a range camera, such as a time-of-flight camera, structure light camera, stereo camera or a 3D camera, and thus the images may be 3D images.

In an embodiment, the specific feed consuming animal is identified by use of a visible tag attached of the animal and preferably visible on the at least a part of the images. In one embodiment, the visible tag comprises a colour code and/or a barcode on an ear tag or a collar of the animal. In a preferred embodiment, the animal id identified by optimal detection of a specific colour code and/or bar code on a collar or ear tag carried by the specific animal. Further, animals may be identified by wirelessly readable tags attached to the animals.

In one embodiment, the images are acquired continuously, thereby allowing detection of the feed consumption in real time. For example, the images are acquired as a video signal or at least once per minute, e.g. every 1, 5, 10, 20 or 30 second. In a preferred embodiment, one image is acquired every 1 to 5 minutes; for example, an image is acquired approximately every 2 minutes. The images may further be acquired at selected time points. E.g. a range image of at least a part of the feeding area may be acquired when an animal initiates, pauses and/or ends a feeding process. Or an image of at least a part of the feeding area is acquired when an animal removes the head from the feeding area.

It is to be understood, that the method can be adapted to comprise any of the embodiments mentioned above for the system.

A further aspect regards a computer readable medium having computer executable instructions stored thereon for performing a method as mentioned above and preferably performed on a system as mentioned above.

FIG. 1 shows a system for determining feed consumption of at least one cow. The presented embodiment is a preferred embodiment for the determining of feed consumption for a cattle and/or individual cows. When using the term cow there is referred to both female and male animals of cattle.

In the embodiment disclosed in FIG. 1 the feed 2 placed in the feeding area is roughage. But as stated previously the presently disclosed methods and systems are not limited to feed in the form of roughage, but to any feed distributed to the animals via the feeding area.

FIG. 1 discloses part of the inside of a cowshed 1 having roughage 2 on a feeding area being on one side and three cows on the other side of a feed fence 7. Cowshed 1 is to be understood as housing for cattle, which also can be denoted a barn. The system of the present embodiment can also be used outside; however it is preferred to use a feed fence 7 in order to ensure that the cows can access the roughage 2 but not walk and lie on it. Further, the feed fence 7 makes it easier to feed to cows.

Above the roughage 2 three range cameras 4 are placed, for acquiring images of the roughage 2. The range cameras 4 are mounted on a bar which is part of the feed fence 2.

The three cows 3 shown in FIG. 1 have an identification tag 5 in the ear. Alternatively or in combination, the cows can have a collar 8 which can be used as an identification tag. In positioning the identification tag on the cow, the neck or ear are preferred, as the cow 3 has the head and neck through the feed fence 7 and it is thereby clearly visible for the cameras 4. These identification tags are preferred, because the farmer can attach them to the animal himself, without the need for a veterinarian. In addition, the identification tags shown, enables the farmer to identify the animals by visual inspection.

Alternatively or in combination with the above mentioned identification tag, a chip can be implanted by use of a needle. These chips are known in the art and used as identification tags for domestic animals like cats and dogs. The chip can be read by use of a scanner which can be positioned near the roughage and attached to a processing unit. Such a chip can for example be a RFID chip.

In addition an identification tag 5 can be used when deciding the composition of the feed for a specific cow 5.

When a cow 3 feeds, a camera 4 forwards images to processing means in the form of a computer 6, in the present embodiment the cameras 4 forward a video stream to the computer 6, which then identifies the cow 3 by use of the identification tag 5 and register the amount of roughage 2 present when the cow 3 started to feed. When the cow 3 withdraws its head from the feed fence 7, the computer registers the amount of roughage present when the cow 3 stopped feeding. By use of that data it is possible for a computer 6 to calculate and thereby determine the cow's roughage consumption.

The computer 6 may be located in the cowshed 1 or for example in a control room in the vicinity. The computer 6 can be connected to the cameras 4 by wire and/or wirelessly. The processing means can also be separated from a recording means that acquires and stores images, such as video of the feeding area and the images can then, possibly later, be transferred to the computer 6 for analysis.

By use of the present invention it is possible to use the information regarding an animal's feed consumption for deciding the general composition of the feed for a specific animal. The feed composition can for example be determined dependent on milk production or growth of the animal relative to the feed consumption. In order to ensure that an animal has access to feed composed for that specific animal, and the other animals do not have, access control via the identification tag can be used.

By use of the determined feed consumption for each cow 3, the farmer can get the sufficient information to calculate the contribution margin and efficiency of the individual cow 3 based on roughage 2 intake.

The images captured by the cameras 4 of the embodiment in FIG. 1 overlap, and as they are captured, simultaneously, the computer 6 can compare them in order to enhance the accuracy in determining the amount of roughage 2 present in the feeding area. The computer 6 can also combine the images to form a stitched image and use that to determine the reduction in roughage 2 and hereby the roughage consumption of the cow 3.

In a preferred embodiment, the cameras 4 are 3D-cameras or range cameras. This enables the computer to calculate the distance to the roughage 2 and makes it possible to calculate the volume of the roughage 2 with a high precision.

The cameras 4 in the embodiment on FIG. 1 are stationary-mounted on the feed fence 7. Alternatively or in combination, cameras can be mounted in a way so they can be moved and/or be directed in order to take images of the roughage 2 from different angles and move to where the roughage 2 is situated on the feeding area. In relation to the stationary cameras, in this way it is possible to use fewer cameras to cover a larger area. However, when the mechanics used to move cameras is exposed to the harsh environment of the cowshed it can degrade, leading to high maintenance costs. In addition, moving cameras are more expensive than stationary.

The presently disclosed system and methods has been tested with four different animals (cows). Each cow was located in a box with a feeding area in front of it. A separate range cameras was located for each box. The test was equal for each cow in each box. Initially a range image was acquired of the empty feeding area, to obtain a base level of the feeding area. A specified weight of roughage was placed at the empty feeding area and a range image was acquired. Additional range images were acquired for each 2 minute period while the cow was in the box and eating. After 90 minutes the roughage remaining on the feeding area was weighed, and returned to the feeding area. The cow stayed in the box for a period where after it was removed for milking. The roughage remaining on the feeding area was weighed again. The cow entered the box again and after 90 minutes the roughage was weighed again. A last range image of the roughage remaining in the feeding area was acquired before the final weighing of the roughage.

The images were sorted and processed and the reduction in roughage was determined by calculating the height of each pixel of the roughage in the images. The volume of the reduction can then be calculated corresponding to the feed consumption of the cow. The base level of the feeding area is also known.

FIGS. 2a-d show correlations between actual and calculated feed consumption of the four cows. The graphs to the left marked "3D picture" show the volume of the feed vs. time for the four cows. The volume is in arbitrary units. The reduction in the feed volume is seen by the decrease in the volume in the graphs which is a result of the image processing. The graphs to the right labelled "3D counts vs roughage" show the correlation between the volume of feed consumed by each cow assessed by the image processing vs. the actual measured (by weighing) consumption of the cows in kilos of roughage (in the graph to the right in FIG. 3A the axes are switched) in the upper. As seen from the right graphs there is an almost linear correlation between the weighed amount of roughage consumed by each cow and the amount assessed by the presently disclosed system and method.

REFERENCE LIST 1 cowshed
2 feed
3 cow
4 camera
5 identification tag
6 computer
7 feed fence
8 collar

FURTHER DETAILS OF THE INVENTION

The invention will now be described in further details with reference to the following enumerated items:
1. System for determining feed consumption of at least one animal in a livestock comprising,
   at least one identification tag attached to the at least one animal, whereby a specific animal can be identified,
   a feeding area having feed accessible to the at least one animal,
   at least one camera adapted to acquire images of the feed in the feeding area at different times,
   processing means adapted to determine the feed consumed by an identified specific animal by analysing the reduction of feed as represented on at least two images.
2. System according to item 1, wherein the at least one camera is a 3D camera, preferably the 3D camera is adapted to acquiring topographic images.
3. System according to any of the preceding items, wherein the system further comprises means for controlling the position and/or the angle of the at least one camera.
4. System according to any of the preceding items, wherein the at least one camera is stationary.
5. System according to any of the preceding items, wherein the processing means are adapted to identify a specific animal via a visible tag on the images.
6. System according to any of the preceding items, wherein the system further comprises a tag reader suitable for wirelessly identifying a specific animal in the feeding area.
7. System according to any of the preceding items, wherein at least two cameras acquire images simultaneously and wherein the processing means are adapted to combine the images in order to determine the amount of feed in the feeding area.
8. Method for determining feed consumption of at least one animal in a livestock comprising the steps of,
   providing a feeding area having feed accessible to the at least one animal,
   supplying the at least one animal with an identification tag to identify a specific animal,
   acquire a plurality of images of the feeding area at different times,
   identify a specific feed consuming animal on the plurality of images,
   by use of the images of the specific feed consuming animal determine the reduction of feed as disclosed on those images,
   wherein the feed consumption for the specific animal is determined as the reduction of feed on those images.
9. Method according to item 8, wherein the images are acquired by use of at least one camera, preferably a 3D camera.
10. Method according to any of the items 8 to 9, wherein the specific feed consuming animal is identified by use of a visible tag attached of the animal on the plurality of images.
11. Method according to any of the items 8 to 9, wherein the specific feed consuming animal is identified by use of a tag that is wirelessly readable.
12. A computer readable medium having computer executable instructions stored thereon for performing a method according to any of the items 8 to 11.

The invention claimed is:

1. An animal monitoring system for determining feed consumption of one or more animals feeding at a feeding area, the system comprising:
   an imaging unit for range imaging the feeding area, the imaging unit comprising one or more time-of-flight cameras, or one or more stereo cameras, or one or more structured light cameras, or one or more light-field cameras, or one or more 2D cameras in combination with one or more depth sensors, or a combination thereof;
   identification means configured to uniquely identify each feeding animal; and
   a processor configured for acquiring subsequent range images of the feeding area and assessing the amount of feed consumed by each identified animal by determining the reduction of feed in between said subsequent range images with the feed consumption of the feeding area in front of each identified animal.

2. The system according to claim 1, wherein the imaging unit is configured for acquiring topographic images.

3. The system according to claim 1, wherein the imaging unit is configured for continuously imaging at least a part of the feeding area.

4. The system according to claim 1, wherein the imaging unit is configured for imaging at least a part of the feeding area at predefined or selected time points.

5. The system according to claim 1, wherein the imaging unit is configured for imaging a predefined or selected part of the feeding area.

6. The system according to claim 1, further comprising a control unit configured for controlling the position or the angle of the imaging unit, or the position or the angle of cameras of the imaging unit, or a combination thereof.

7. The system according to claim 1, wherein the reduction in feed between subsequent images is determined by calculating the difference in height of corresponding image areas and determining the volume of this difference.

8. The system according to claim 1, wherein the reduction in feed between subsequent images is determined by identifying the feed in each image and calculating the difference in height of corresponding image areas representing feed in subsequent images.

9. The system according to claim 1, wherein the imaging unit comprises two or more range cameras configured to acquire images simultaneously and wherein the processing means are configured to combine the images in order to determine the amount of feed in the feeding area.

10. The system according to claim 1, wherein the identification means comprises identification tags for attachment to said one or more animals.

11. The system according to claim 10, wherein the identification tags are RF tags or RFID tags, or wherein the identification tags are visible tags comprising a letter, a number, a symbol, a colour code, a symbol code, or a pattern code, or a combination thereof.

12. The system according to claim 1, wherein the identification means are configured to identify a feeding animal by means of an identification tag attached to each animal.

13. The system according to claim 1, wherein the identification means are configured to identify a feeding animal by identifying a colour code of an identification tag attached to the animal.

14. The system according to claim 1, wherein the system is configured to determine the time point of an identified animal initiating, pausing, or ending a feeding process, or a combination thereof.

15. The system according to claim 1, wherein the system is configured to determine when an identified animal removes its head from the feeding area.

16. The system according to claim 1, wherein the system is configured such that a range image is acquired when an identified animal removes its head from the feeding area or when an identified animal initiates or ends a feeding process.

17. The system according to claim 1, wherein the processing means is configured to divide images of the feeding area into one, two, three, four or more animal specific parts, each animal specific part corresponding to an identified animal or wherein the processing means is configured to select an animal specific part of an image of the feeding area based on the position of the front or the head of said animal.

18. The system according claim 17, wherein said animal specific part is a predefined area relative to the position of the animal.

19. The system according to claim 1, wherein the feed is roughage, concentrate, or a mixture thereof.

20. A method for assessing the feed consumption of one or more animals feeding at a feeding area, the method comprising:
acquiring, using an imaging unit comprising one or more time-of-flight cameras, or one or more stereo cameras, or one or more structured light cameras, or one or more light-field cameras, or one or more 2D cameras in combination with one or more depth sensors, or a combination thereof, range images of the feeding area over a period of time while said animal(s) are feeding;
identifying at least one of said feed consuming animals in at least two of said range images; and
assessing, by a processor, the amount of feed consumed by each identified animal by determining the reduction of feed between subsequent images in said at least two range images.

21. The method according to claim 20, wherein the reduction in feed between subsequent images is determined by calculating the difference in height of corresponding image areas and determining the volume of this difference.

22. The method according to claim 20, wherein the reduction in feed between subsequent images is determined by identifying the feed in each image and calculating the difference in height of corresponding image areas representing feed in subsequent images.

23. A method for assessing the relative feed consumption of a plurality of animals in a livestock feeding at a feeding area, the method comprising:
acquiring, using an imaging unit comprising one or more time-of-flight cameras, or one or more stereo cameras, or one or more structured light cameras, or one or more light-field cameras, or one or more 2D cameras in combination with one or more depth sensors, or a combination thereof, a series of range images of the feeding area over a period of time;
identifying all animals consuming feed;
assessing, by a processor, the amount of feed consumed by each identified animal by determining the reduction of feed between subsequent range images in said series of range images displaying an identified animal; and
determining the amount of feed consumed by one identified animal relative to the amount of feed consumed by the remaining identified animals.

* * * * *